(12) United States Patent
Tanaka et al.

(10) Patent No.: US 8,811,783 B2
(45) Date of Patent: Aug. 19, 2014

(54) TAPE-LIKE OPTICAL FIBER CORE, PRODUCTION METHOD THEREFOR, TAPE CORE-CARRYING CONNECTOR, TAPE CORE-CARRYING OPTICAL FIBER ARRAY, AND OPTICAL WIRING SYSTEM

(75) Inventors: Kousuke Tanaka, Tochigi (JP); Hiroyasu Sugiyama, Tochigi (JP); Takehiro Hosokawa, Tochigi (JP); Keiichi Tanaka, Tochigi (JP); Tsuyoshi Ikada, Tochigi (JP); Kazuaki Negishi, Kanagawa (JP); Yoshiaki Nagao, Kanagawa (JP); Toshio Akiyoshi, Kanagawa (JP); Kazuhiro Sato, Tochigi (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1052 days.

(21) Appl. No.: 10/514,813

(22) PCT Filed: May 16, 2003

(86) PCT No.: PCT/JP03/06128
§ 371 (c)(1),
(2), (4) Date: May 23, 2005

(87) PCT Pub. No.: WO03/098307
PCT Pub. Date: Nov. 27, 2003

(65) Prior Publication Data
US 2005/0201697 A1    Sep. 15, 2005

(30) Foreign Application Priority Data

May 17, 2002  (JP) .............................. P. 2002-143789
May 17, 2002  (JP) .............................. P. 2002-143791
Aug. 26, 2002  (JP) .............................. P. 2002-245038

(51) Int. Cl.
*G02B 6/44*     (2006.01)
*G02B 6/08*     (2006.01)

(52) U.S. Cl.
CPC ............... *G02B 6/4436* (2013.01); *G02B 6/08* (2013.01); *G02B 6/4403* (2013.01); *G02B 6/4495* (2013.01)
USPC ....................................................... 385/114

(58) Field of Classification Search
USPC ........................................................ 385/114
See application file for complete search history.

(56) References Cited

U.S. PATENT DOCUMENTS 3,792,113 A * 2/1974 Goswami ...................... 525/123
3,920,432 A   11/1975 Smith (Continued)

FOREIGN PATENT DOCUMENTS

CN    1021258 C    6/1993
EP    0 306 204 A1 3/1989

(Continued)

OTHER PUBLICATIONS

E.W. Flick, "Adhesives, Sealants and Coatings for the Electric Inudstry", 1992, 749, W. Publishing.

(Continued)

*Primary Examiner* — Uyen Chau N Le
*Assistant Examiner* — Hoang Tran
(74) *Attorney, Agent, or Firm* — McDermott Will & Emery LLP

(57) ABSTRACT

An optical fiber ribbon comprising a plurality of the coated optical fibers 2 arranged in plane and flame-retardant films 4*a* and 4*b* to integrate the coated optical fibers 2 is provided. The flame-retardant films 4*a* and 4*b* have an adhesive layer 5 formed thereon, and a plurality of the coated optical fibers 2 arranged in plane are integrated by the adhesive layer. The optical fiber ribbon 1 in this constitution uses flame-retardant films, wherein the ribbon thickness can be lowered and separation of single fiber can be facilitated by tearing off the film.

27 Claims, 13 Drawing Sheets

(56) References Cited

U.S. PATENT DOCUMENTS

| | | | |
|---|---|---|---|
| 4,187,214 A | 2/1980 | Needham et al. | |
| 4,447,122 A * | 5/1984 | Sutehall | 385/103 |
| 4,468,089 A * | 8/1984 | Brorein | 385/114 |
| 4,900,126 A | 2/1990 | Jackson et al. | |
| 5,204,928 A * | 4/1993 | Konda et al. | 385/128 |
| 5,557,703 A * | 9/1996 | Barker et al. | 385/128 |
| 6,478,476 B1 * | 11/2002 | Katsura et al. | 385/78 |
| 6,504,982 B1 * | 1/2003 | Greer, IV | 385/128 |

FOREIGN PATENT DOCUMENTS

| | | | |
|---|---|---|---|
| EP | 0 418 094 A2 | 3/1991 | |
| EP | 0 516 438 A1 | 12/1992 | |
| EP | 0 985 943 A2 | 3/2000 | |
| EP | 1 003 055 A1 | 5/2000 | |
| EP | 1 065 546 A1 | 1/2001 | |
| JP | 52-132041 | 10/1977 | |
| JP | 57-5010 A | 1/1982 | |
| JP | 03-155511 | 7/1991 | |
| JP | 3-155511 | 7/1991 | |
| JP | 7-16905 | 3/1995 | |
| JP | 09-80279 | 3/1997 | |
| JP | 09080279 A * | 3/1997 | |
| JP | 10040920 A * | 2/1998 | |
| JP | 10-148741 | 6/1998 | |
| JP | 11-72669 | 3/1999 | |
| JP | 2002-29784 A | 1/2002 | |
| JP | 2002-080813 | 3/2002 | |

OTHER PUBLICATIONS

European Office Action issued in European Patent Application No. EP 03 725 808.4 dated Nov. 13, 2009.

Chinese Office Action, issued in corresponding Chinese Patent Application No. 038112841, dated on Sep. 7, 2007.

* cited by examiner (A)  (B)

TAPE-LIKE OPTICAL FIBER CORE, PRODUCTION METHOD THEREFOR, TAPE CORE-CARRYING CONNECTOR, TAPE CORE-CARRYING OPTICAL FIBER ARRAY, AND OPTICAL WIRING SYSTEM

TECHNICAL FIELD

The present invention relates to an optical fiber ribbon, a method of manufacturing the same, a connector with an optical fiber ribbon, an optical fiber array with an optical fiber ribbon and an optical wiring system, and in particular to a flame-retardant optical fiber ribbon.

BACKGROUND ART

The recent introduction of the FTTH (Fiber to the Home) system has enabled the use of optical fibers for wiring in the general household appliances, and thus the demand on optical communication has significantly increased. As a transmission mode to cope with the increased demand, wavelength division multiplex (WDM) has been introduced. WDM is a communication mode in which one optical fiber transmits signals of multiple wavelengths, and in association with the introduction of this system, there is an increasing demand on an optical fiber ribbon with multi-fibers, such as optical fiber ribbons with 4 fibers, 8 fibers, 12 fibers, 16 fibers, 24 fibers, 32 fibers and the like.

Under such circumstances, the optical fiber ribbon found uses in indoor wiring, or internal wiring in devices. For this reason, the demand on the flame-retardant optical fiber ribbon is ever increasing in order to prevent combustion of the fibers on fire.

As one form of such optical fiber ribbons with multi-fibers, interest has been attracted by an optical fiber ribbon which achieves a thin type multi-fiber structure.

A conventional tape code is formed such that in the periphery of a plurality of coated optical fibers 2 disposed in a row in plane as shown in FIG. 22(A), an optional anti-tension body k which is a reinforcing fiber, etc. is disposed as shown in FIG. 22(B), and the periphery of optional anti-tension body k is coated with a polyvinyl chloride (PVC) resin composition 16.

For a method for flame-retardation in an optical fiber ribbon, there can be mentioned a method in which a flame-retardant material is used in the coating for a coated optical fiber per se, and a method in which the structure of a coated optical fiber itself is retained as is and its periphery is coated with a flame-retardant material.

However, disadvantages are found in any of such methods. In the former method, although the flame-retardancy is imparted to the coating material for a coated optical fiber, the flame-retardant materials in general are poor in light transmission. For example, a conventional optical fiber ribbon is, in many cases, formed and coated with a UV-curable resin which is a non-flame retardant material, but when a flame-retardant is added to this UV-curable resin, UV transmission is reduced, thus making it difficult to cure the UV-curable resin.

For this reason, such UV-curable resins that are widely used in the coating material for a coated optical fiber cannot be used, and thus reduction in productivity is unavoidable.

Meanwhile, in the latter method, since the structure of a coated optical fiber itself is retained as is, the dimension of tape code is enlarged and thus it is inappropriate for wiring into the narrow sites such as internal wiring in devices.

The situation also applies to an optical fiber ribbon (a ribbon-type optical fiber).

An optical fiber ribbon in general has a structure in which a plurality of optical fibers are arranged in parallel, and their peripheries are all coated with a coating layer (a tape layer).

In the case where this optical fiber ribbon is to be made flame-retardant, the following methods can be taken into consideration: a method in which a flame-retardant material is used in the coating for a coated optical fiber or in the tape layer in the same manner as for a coated optical fiber; and a method in which the structure of the optical fiber ribbon itself is retained as it is, and its periphery is coated with a flame-retardant material.

In this case, too, for the same reason given for a coated optical fiber, addition of a flame-retardant, for example, to a coating made of a UV-curable resin, for the purpose of flame-retardancy as described for the structure in the former method, results in reduction of UV transmission, thus making it difficult to cure the UV-curable resin.

Further, in the latter case, coating with a flame-retardant material leads to a larger thickness, and an adverse effect thereof on miniaturization or micronization of devices is unavoidable.

Additionally, in the case of such an optical fiber ribbon, since it often occurs that signal transmission is individually achieved in each of the fibers, it has been necessary to make a measurement after extracting one particular fiber, or to carry out branch wiring from an aerial cable, for example.

This step of separating single fiber is carried out such that the resin coating is torn off and the optical fibers are extracted one by one, requiring very delicate manual operation. Further, since the resin attached around the optical fibers after separation is in the form of being finely divided, it is very difficult to remove the resin completely, thus lowering workability.

Moreover, in the middle of the course of communication, when a coated optical fiber is extracted by carrying out the separation of single fiber from the above-mentioned optical fiber ribbon, stress applied to the coated optical fiber may lead to loss of transmission and thus to possible cut-off in communication.

The object of the present invention is to provide a thin type, flame-retardant optical fiber ribbon.

Another object of the present invention is to provide an optical fiber ribbon for easy separation of single fiber.

Another object of the present invention is to provide a method of manufacturing the optical fiber ribbon with easy workability and high reliability.

DISCLOSURE OF THE INVENTION

The optical fiber ribbon according to the present invention is characterized in comprising a plurality of coated optical fibers arranged in a plane, and a flame-retardant film which integrates the coated optical fibers.

According to such constitution, in spite of its high flame-retardant property, an optical fiber ribbon can be formed in a thickness that is not significantly greater than that of any conventional optical fiber ribbon, thus allowing miniaturization and high densification of wiring in accordance with miniaturization of devices. The term flame-retardant material herein means those materials such as resins having flame-retardancy. Furthermore, a flame-retardant is an additive which cannot act as a structured body per se, and which can impart flame-retardancy upon its addition to a base material having no flame-retardancy.

That is, since this film is formed to comprise a film substrate and an adhesive layer for fixing the film substrate and the coated optical fiber, the thickness of the film would be of a value approximately close to the sum of the diameter of the coated optical fiber and the thickness of the film substrate, thereby allowing a thin type optical fiber ribbon to be provided. Further, due to the presence of the film substrate, the film does not break upon peeling, and the film substrate maintains the shape, facilitating separation of single fiber. In this case, according to the desired extent of flame-retardancy, the film can be formed such that either of the film substrate or the adhesive may have flame-retardancy.

Furthermore, preferably by setting the value of the Young's Modulus of the adhesive layer to 10 to 500 MPa, the increase in the loss caused by the application of the deflection of a coated optical fiber by side pressure can be prevented. However, when the Young's Modulus of the adhesive layer is less than 10 MPa, the fiber fixing effect is lowered. Particularly, in the case of a coated optical fiber with micro-scale diameters, even though the increase in the loss of transmission caused by side pressure has been significant, the loss of transmission can be reduced by setting the value of Young's Modulus of the adhesive layer within the above-mentioned range.

Moreover, the shrinkage of the film under a heat treatment at 150° C. for 30 minutes is preferably 3% or less, thereby it being possible to reduce bending deflection. Especially in the case of the adhesive layer comprising a thermoplastic resin, when it is fixed by heating, a large shrinkage will lead to an increase in the shrinkage deflection of the coated optical fiber, which causes an increase in the loss.

Further, when each of the coated optical fibers comprises a colored layer, it becomes easy to distinguish them upon branch connection. When all of the coated optical fibers that constitute the optical fiber ribbon comprise a colored layer, it is easy to distinguish them; however, as long as at least one coated optical fiber other than the centrally located coated optical fiber is given a color different from the color of other coated optical fibers, it is easy to recognize the arrangement direction, which prevents misconnection.

In this case, preferably, when at least a portion of the film substrate is light-transmissive, the sequence of arrangement of the coated optical fibers can be detected easily by external detection of the colored layers.

In addition, when the adhesive layer contains a thermoplastic resin, the layer can be fluidized by heating, and cured while being advantageously inserted between the coated optical fibers, and between the coated optical fibers and the film substrate, resulting in a thin type optical fiber ribbon with high strength. Further, since the adhesive layer comprises a thermoplastic resin, the adhesive layer can be cured together with the flame-retardant while being more advantageously inserted between the coated optical fibers, and between the coated optical fibers and the film substrate, thereby imparting flame-retardancy more efficiently.

The flame-retardant film is favorably fixed without causing thickening, if the film is adhered to one side of a plurality of the coated optical fibers arranged in plane.

It is also preferable to form the flame-retardant film such that regions of partially exposing a plurality of the coated optical fibers are formed intermittently in the longitudinal direction.

Preferably, the film substrate is characterized in comprising a polyester (PET) resin incorporated with a flame-retardant. This allows formation of an optical fiber ribbon with high flame-retardancy.

The optical fiber ribbon preferably has the flame-retardant property as defined in UL 1581 VW-1. UL 1581 VW-1 is a standard used in determining the flame-retardancy of devices or of cables or codes which are installed in the devices. This testing evaluates the combustibility by combusting the real cables or codes, and thus it is established as a method to obtain an evaluation result that simulates the real situation of a fire closely.

Further, the optical fiber ribbon has good flexibility, and on consideration of easy wiring and spacing factors, it is preferable that the optical fiber ribbon has a smaller cross-section and a thickness of 480 µm or less. The thickness is more preferably 400 µm or less.

Preferably, the film substrates are adhered on the two opposite sides of the coated optical fibers arranged in plane, and are protruded beyond the frontline of the arranged coated optical fibers such that the end sections of the film substrates are exposed.

Furthermore, preferably, the flame-retardant film has film substrates and an adhesive layer, the adhesive layer being a polyolefin-based resin with a bromine-based flame-retardant added.

When a polyolefinic resin with a bromine-based flame-retardant added is used as the adhesive layer, the flame-retardancy is improved, and an optical fiber ribbon that satisfies the combustibility defined by the UL 1581 UV-1 testing can be obtained. Further, since the polyolefinic resin is inexpensive and has good processability, the production cost or product cost of the optical fiber ribbon can be reduced.

In addition, a plurality of coated optical fibers which have been preliminarily subjected to integration with a resin, can be coated with the flame-retardant film. In this way, it is possible to impart flame-retardancy easily to even the finished coated optical fiber products, thus extending the range of possible applications even wider. Further, although the optical fiber ribbon becomes thickened, the mechanical strength becomes higher in proportion to the increase of the thickness. As the resin for integration, a UV-curable resin can be used.

The method of the present invention is characterized by comprising an arranging step of arranging a plurality of coated optical fibers in plane, and a bonding step of bonding a plurality of the arranged coated optical fibers with a flame-retardant film.

According to this method, bonding with a flame-retardant film allows providing a tough, thin type optical fiber ribbon. It is also possible to carry out the bonding advantageously by bonding while pressing.

Preferably, the flame-retardant film has film substrates and a thermoplastic resin layer formed on the surface of the film substrate, and the bonding step can be made to include the bonding steps of superimposing a plurality of the arranged coated optical fibers onto the flame-retardant film and heat pressing the assembly, so that the adhesive resin is inserted between the coated optical fibers or between the coated optical fibers and the film substrate, thus favorably increasing the adhesion.

Furthermore, prior to the bonding step, the step may also include a step of integrating a plurality of the coated optical fibers with a UV-curable resin for coating. Then, it is possible to impart flame-retardancy easily to the finished coated optical fibers, thus extending the range of possible applications even wider. Further, although the optical fiber ribbon becomes thickened, the existing apparatuses can be used to form the optical fiber ribbon, and thus productivity is improved.

A connector with an optical fiber ribbon, in which the above-mentioned optical fiber ribbon, or the optical fiber ribbon formed by the above-mentioned method is connected to a multi-fiber connector, is also effective since branch connection is easy on the way.

A connector with an optical fiber ribbon, to which the optical fiber ribbon is connected to an entire-resin, multi-fiber optical ferrule formed from a flame-retardant resin, is also effective. Recently, there has been development particularly in Raman amplification technique or the like, and thus there may be the case where light of high output of a few hundred milliwatts are used in the transmission route.

Preferably, the entire-resin, multi-fiber optical ferrule may be composed of a PPS resin.

Furthermore, a fiber array with an optical fiber ribbon, in which the above-mentioned optical fiber ribbon, or the optical fiber ribbon formed by the above-mentioned method is connected to a fiber array, is also effective.

It is also effective to use the above-mentioned optical fiber ribbon or an optical fiber ribbon produced by the above-mentioned method in an optical wiring system.

REFERENCE NUMERALS

Additionally, numbers in the figures indicate the following:

| | |
|---|---|
| 1 | Optical fiber ribbon, |
| 2 | Coated optical fiber, |
| 3 | Arranged coated optical fibers |
| 4, 4a and 4b | Film substrates, |
| 5 | Adhesive layer, |
| 16 | Resin, |
| 50 | Testing box, |
| 51 | Stand, |
| 52 | Gas burner, |
| 54 | Specimen, |
| 55 | Flag, and |
| 56 | Serge cotton. |

BEST MODE FOR HAVING OUT THE INVENTION

Hereinafter, the highly flame-retardant optical fiber ribbon according to the invention is explained in detail with reference to the drawings.

Embodiment 1

Figure 1:
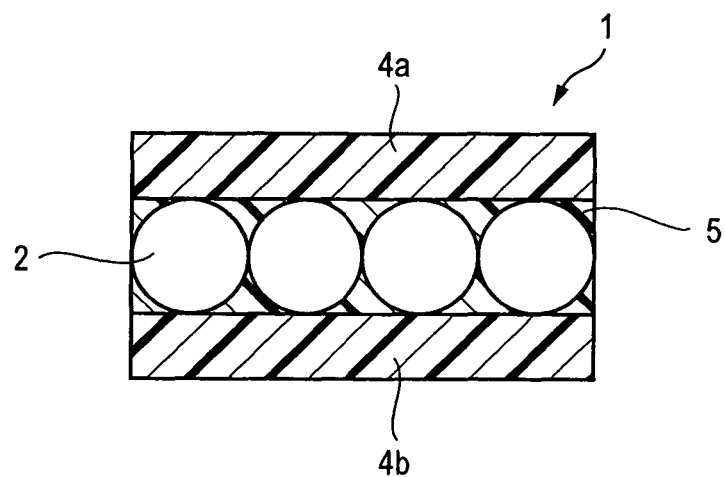
FIG. 1 is a schematic diagram showing the cross-section of the optical fiber ribbon of Embodiment 1 of the present invention.

FIG. 1 is a schematic diagram showing the cross-section of the highly flame-retardant optical fiber ribbon of the present invention. As shown partially in the schematic diagram of FIG. 1, the highly flame-retardant optical fiber ribbon 1 of this embodiment is characterized in that the periphery of the four coated optical fibers 3 in which the coated optical fibers 2 having an optical fiber diameter of 250 μmφ are arranged in plane with a pitch of 250 μm is pressed between the polyester (PET) films 4a and 4b via an adhesive layer 5 consisting of a polyolefin resin with a bromine-based flame-retardant added as a flame-retardant. Here, it is also possible to add a bromine-based flame-retardant to the polyester films. The thickness of the film substrate herein was 25 μm, and the thickness of the adhesive layer 30 μm.

Figure 2:
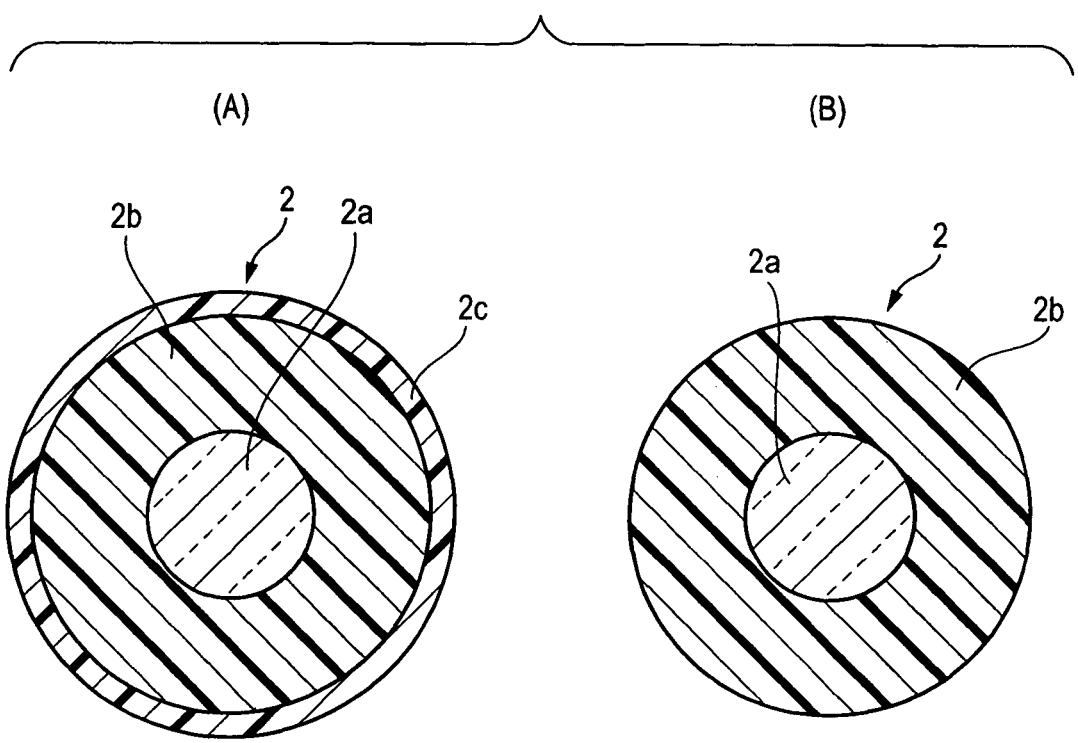
FIG. 2 is a schematic diagram showing the cross-section of the coated optical fiber of the optical fiber ribbon of the present invention.

The highly flame-retardant optical fiber ribbon 1 is formed by arranging four coated optical fibers 2 in parallel in a latitudinal row, and pressing them between polyester films 4a and 4b via an adhesive layer 5. As the coated optical fiber 2, use is made of a quartz-based single-mode coated optical fiber consisting of a glass fiber 2a having a core and a cladding and a coating 2b surrounding the periphery of the fiber, or a quartz-based multi-mode coated optical fiber, as illustrated in magnified FIG. 2(A). 2c is a colored layer. Although a quartz-based multi-mode coated optical fiber is used in this embodiment, without being limited thereto, applications can also be made on a polymer-cladding optical fiber or a plastic optical fiber. As shown in FIG. 2(B), it is also possible to remove the colored layer 2c and to use a coated optical fiber consisting of a glass fiber 2a and a coating 2b only, and a coated optical fiber comprising the colored layer 2c in combination. In this case, the arrangement sequence of the coated optical fibers can be characterized by means of arranging them asymmetrically.

Next, the method of manufacturing the optical fiber ribbon of the present embodiment is explained.

Figure 3:
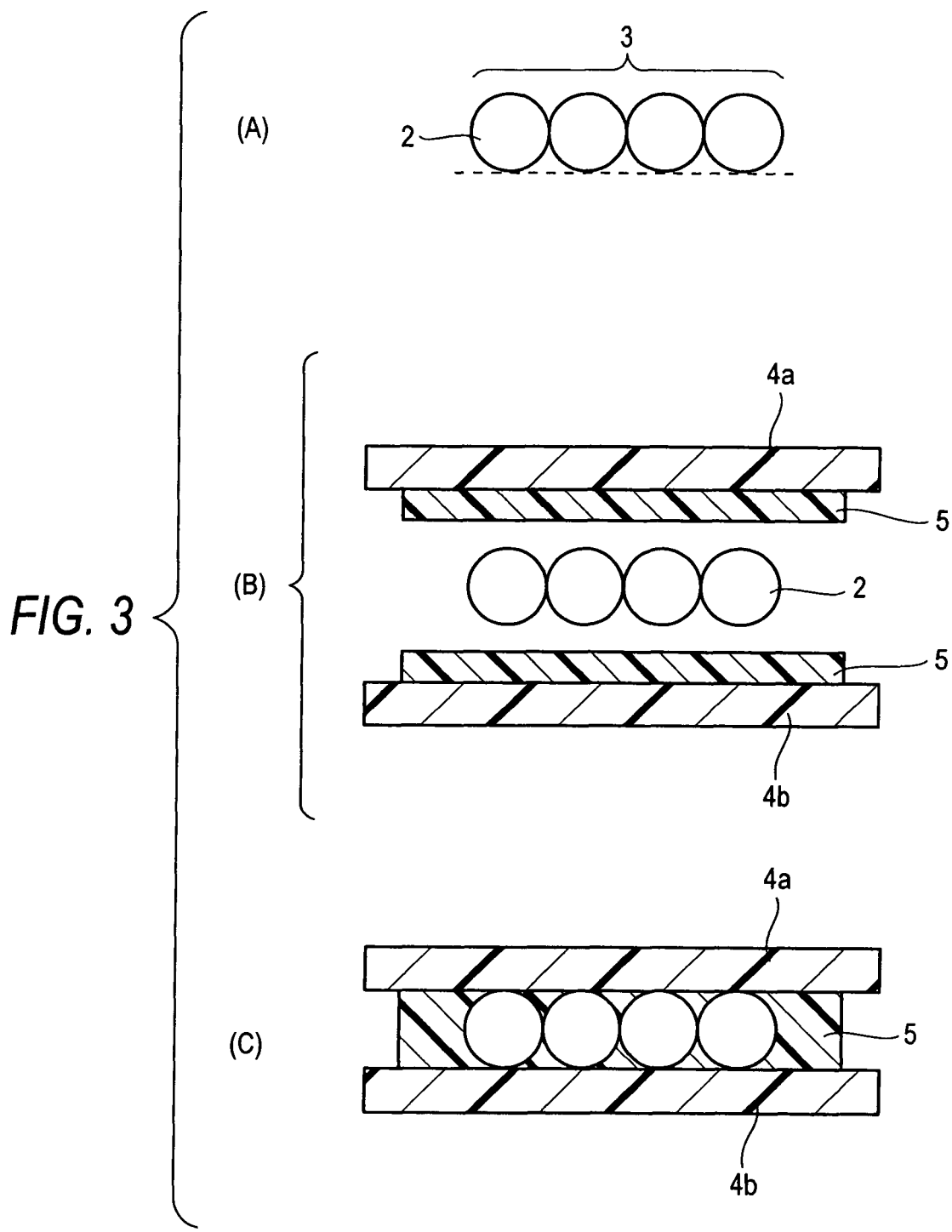
FIG. 3 is a flow diagram showing a method of manufacturing the optical fiber ribbon of Embodiment 1 of the invention.

First, as shown in FIG. 3(A), four coated optical fibers are arranged in plane.

Then, as shown in FIG. 3(B), on the surfaces of the film substrates 4a and 4b consisting of polyester resin with a thickness of 25 μm, an adhesive layer 5 of 30 μm thick, which consists of a polyolefin resin incorporated with a bromine-based flame-retardant, is applied, and a plurality of the coated optical fibers 2 arranged as described above are placed in between these assemblies and heat pressed as shown in FIG. 3(C).

Figure 4:
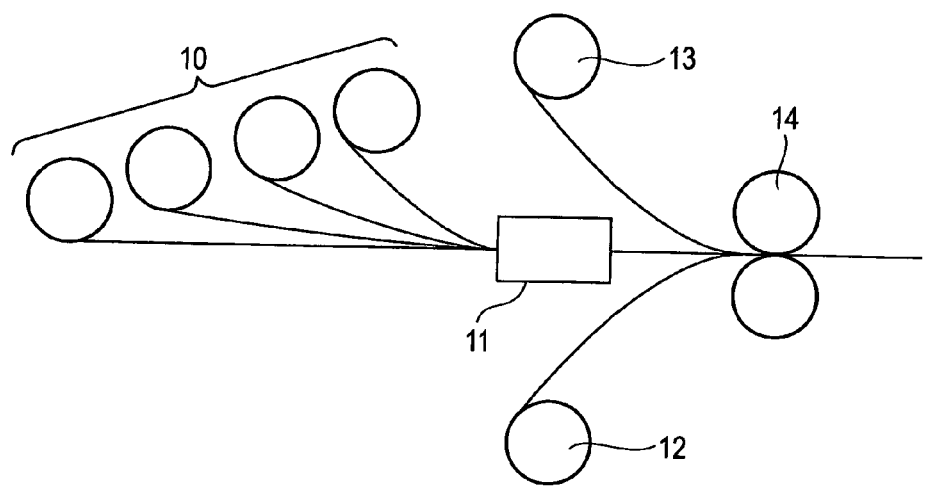
FIG. 4 is a schematic diagram showing an apparatus for manufacturing the optical fiber ribbon of Embodiment 1 of the invention.

FIG. 4 is a schematic diagram of showing the apparatus for production thereof. Four coated optical fibers 2 are supplied from the reels 10 while being successively arranged, and are arranged in plane in an arranging section 11. The pitch of the arrangement is adjusted to supply the film substrates 4a and 4b having an adhesive layer 5 attached thereon from the film reels 12 and 13. The whole assembly is heat pressed in a heating section 14, cooled and then cured. By placing a slit forming section downstream of said heating section 14, the film substrate can have windows (slits) formed thereon at predetermined intervals. This facilitates separation of single fiber.

Thus, the adhesive layer can be advantageously inserted between the coated optical fibers, or between the coated optical fibers and the film substrate, to thus increase the adhesiveness. In this bonding step, the adhesive resin is not cured by light but is softened by heat and then cured together with a plurality of the coated optical fibers and the flame-retardant films superimposed thereon. Thus, addition of a flame-retardant does not interrupt the curing of the adhesive resin, thereby the resin being cured favorably and a tough and highly reliable optical fiber ribbon being formed therefrom. The thickness of the optical fiber ribbon was 300 μm, which is not notably thick compared with conventional ones, and thus the appearance of the optical fiber ribbon was good.

The adhesive layer used in this embodiment has a shrinkage of 0.06 to 1.02% or less such that the shrinkage deflection of the glass fibers can be reduced, and thus the increase in the loss of transmission can be prevented.

Further, since the structure allows bonding of the film substrate onto the coated optical fibers only by simple pressing, productivity of the process is high.

The polyester resin 4a and 4b with a bromine-based flame-retardant added, which serves as the film substrate constituting the outer coating of the optical fiber ribbon 1 of the present embodiment, contains a predetermined amount of bromine. More specifically, the polyester resin with a bromine-based flame-retardant added is one obtained by adding a flame-retardant containing bromine to the polyester resin. The content of bromine is set based on the weight of the polyester resin composition.

In the above-described bonding step, a film that can be used as a flame-retardant film is preferably one having a thermoplastic resin, a thermosetting resin or an adhesive resin formed on the surface of film substrate. Bonding with such films advantageously allows integration of a plurality of optical fibers even in the presence of a flame-retardant, and thus a tough and highly reliable optical fiber ribbon can be formed.

For the adhesive layer, a polyolefin resin with a bromine-based flame-retardant added can be used. Here, bromine is contained in the flame-retardant that improves flame-retardancy of the polyolefin resin, and such flame-retardant includes a bromine-based aromatic compound flame-retardant or the like. When a bromine-based flame-retardant is added to a polyolefin resin, it reduces flammability as well as imparts flame-retardancy to the resin.

Furthermore, the adhesive may contain antimony for flame-retardancy. For an antimony-containing compound, for example, antimony trioxide can be used. Antimony trioxide is an auxiliary flame-retardant, and from addition of the compound alone to a resin, the flame-retardation effect can be hardly expected. However, as in the polyolefin resin composition of the present embodiment, combination with a bromine-based flame-retardant can enhance the flame-retardancy. The synergistic effect of using a bromine-based compound together with antimony trioxide leads to stopping of the chain reactions of thermal decomposition, blocking of oxygen, promoting carbonization or the like.

As described above, cables or codes for wiring in the devices require high flame-retardancy such that they pass a UL 1581 VW-1 vertical flame test.

Hereinbelow, the UL 1581 VW-1 vertical flame test will be described.

Figure 5:
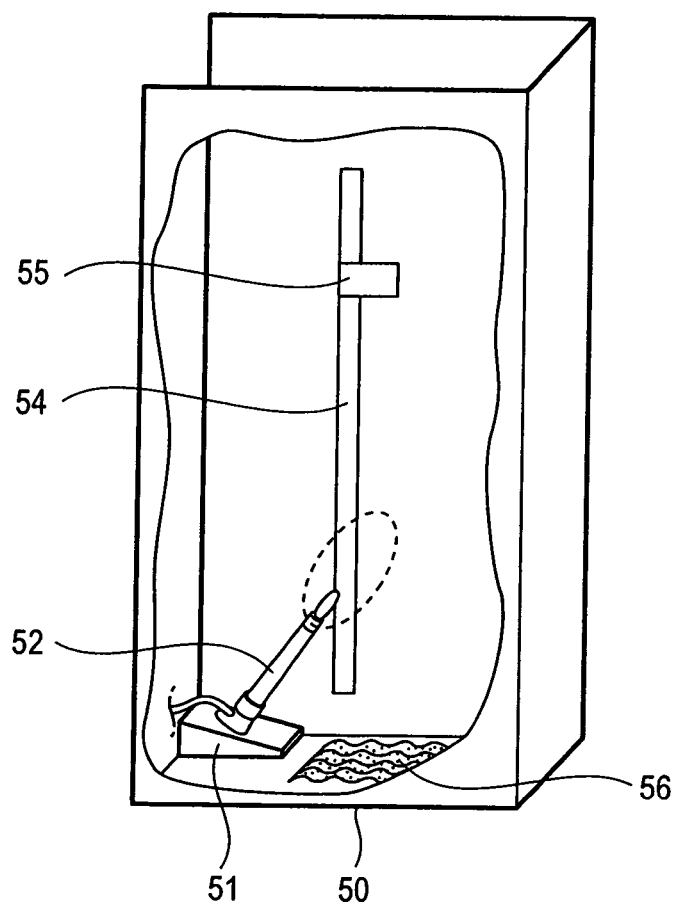
FIG. 5 is a diagram outlining the combustion testing apparatus.

The UL 1581 VW-1 vertical flame test has been established as the strictest test among the combustion tests for cables and codes for wiring in the devices. The evaluation is performed using an optical fiber ribbon with a length of about 457 mm as a specimen 54. FIG. 5 shows an outline of the UL 1581 VW-1 vertical flame tester.

As shown in FIG. 5, the UL 1581 VW-1 vertical flame tester comprises a serge cotton 56 placed in a testing box 50 made of iron, equipped with a gas burner 52 set as inclined at about 20 degrees by a stand 51. The tester is for testing on the extent of combustion of the specimens and of combustion of the serge cotton.

That is to say, in this tester, an optical fiber ribbon taken as the specimen 54 is attached with a flag 55, and is set in the testing box 50 such that the flame reaches a point 76 mm away from the bottom of the specimen at an angle of about 20 degrees. A cycle of firing for 15 seconds and pause for 15 seconds is repeated five times. However, if the specimen continues combustion for 15 seconds or longer during the pause, immediately after fire is extinguished, the burner is ignited.

At this time, the combustion time during the pause and the combustion time after completion of 5 cycles are actually measured, in order to measure the combustion of the flag 55 (a piece of craft paper according to the standard JIS Z1511) and of the serge cotton caused by dropping of the combusting fragments from the specimen 54.

Using the tester constituted as described above, evaluation is performed based on the following criteria.

(i) The combustion does not last for 60 seconds or longer.

(ii) The burned-out or scorched area in the flag is not more than 25%.

(iii) Flaming drops do not fall from the specimen to burn the serge cotton.

Eye observation is performed with respect to the above three criteria.

As described in the above, in the optical fiber ribbon 1 of the present embodiment, a polyester resin containing a bromine-based flame retardant is used as the film substrate, and an adhesive layer consisting of the polyester resin to which a bromine-based flame retardant is incorporated or added. By this, the optical fiber ribbon 1 can satisfy the combustibility as defined by UL 1581 VW-1 vertical flame test. Also, since the polyester resin and polyolefin resin are inexpensive and have good processability, the production cost or product cost can be reduced.

Further, antimony is added to the polyolefin resin with a bromine-based flame-retardant added, thus flame-retardancy of the optical fiber ribbon 1 being improved.

The adhesive layer may also contain an additive such as a plasticizer and a stabilizer, in addition to the polyolefin resin and the flame-retardant as described above. It is also possible to use EVA, polyester or the like, in addition to a polyolefin resin with a bromine-based flame-retardant added.

The film substrate may be a polyester resin or a polyvinyl chloride-based resin, and it is preferably a resin that does not melt up to a temperature of hundred and several tens ° C.

Embodiments of the film substrate and of the flame-retardants are shown in Table 1 below.

TABLE 1

| Base material | Flame-retardant |
| --- | --- |
| Polycarbonate resin | Bromine-based flame-retardant |
| Polyester-based resin | Nitrogen-based flame-retardant |
| PPS resin | Phosphoric acid-based flame retardant |
| PVC resin | Inorganic-based flame-retardant |
| Fluorine-based resin | |
| Polyimide resin | |
| Polyamide resin | |

From Table 1, the PPS resin, the PVC resin and the fluorine-based resin themselves have flame-retardancy. Any combinations of the substrate materials and the flame-retardants in Table 1 are possible.

Embodiments of the resin materials and the flame-retardants forming the adhesive layer are shown in Table 2 below.

TABLE 2

| | Resin Material | | | | Flame-retardant |
| --- | --- | --- | --- | --- | --- |
| Representative Material | Thermoplastic resin | Thermosetting resin | Adhesive | Other curing material | |
| | Polyethylene-based | Epoxy-based | Acrylic-based | Silicone-based (moisture-curable) | Bromine-based flame-retardant |
| | Polypropylenes-based | Phenol-based | Natural rubbers | | Nitrogen-based flame-retardant |
| | Polyesters-based | Unsaturated polyester-based | Synthetic rubber-based | | Phosphoric acid-based flame-retardant |
| | Acrylic-based | | Synthetic resin-based | | Inorganic-based flame-retardant |
| | PVC-based | Silicone-based | Silicone-based | | Antimony compound |

Likewise, any combinations of the resin materials and the flame-retardants in Table 2 are possible.

In this embodiment, the thermoplastic resins with a flame-retardant added were used as an adhesive layer, but the thermosetting resins with a flame-retardant added such as epoxy resins, and the adhesive resins with a flame-retardant added may also be used instead.

In the case of using an adhesive layer made of a thermosetting resin, it can be cured while being advantageously inserted between the coated optical fibers, and between the film substrate and the coated optical fibers, to provide a thin type, high-strength optical fiber ribbon. Since the thermosetting adhesive layer can be effectively cross-linked and cured together with a flame-retardant while being inserted between the coated optical fibers, and between the film substrate and the coated optical fibers, flame-retardancy can be effectively imparted.

When an adhesive layer made of an adhesive resin, it can be favorably adhered only by pressing without heating, and thus it can be also peeled off easily by exerting a force to the degree to overcome the adhesive power, or by weakening the adhesive power by heating.

As such, by using thermosetting resins, thermoplastic resins or adhesive resins each to which is added a flame-retardant as the adhesive layer, the problem of reduced formability, as shown by UV-curable resins, can be overcome, and the adhesive layer can be cured together with a flame-retardant while being advantageously inserted between the coated optical fibers, or between the film substrate and the coated optical fibers, by means of the fluidity of the resin. Thus, flame-retardancy can be effectively imparted.

Embodiment 2

Figure 6:
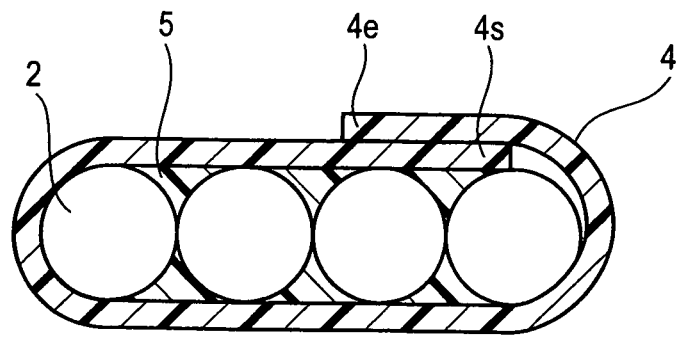
FIG. 6 is a schematic diagram showing the cross-section of the optical fiber ribbon of Embodiment 2 of the invention.

In Embodiment 1, the coated optical fibers 2 were inserted between two sheets of the film substrates 4a and 4b. However, this embodiment is characterized in that, as shown in FIG. 6, a sheet 4 made of a polyethylene resin with a bromine-based flame-retardant added, on which an adhesive layer 5 made of a polyolefin resin with a bromine-based flame-retardant added was applied inside, is wounded around the periphery of the four coated optical fibers 2 arranged in a row in plane, and a winding-starting end 4s and a winding-finishing end 4e are superimposed and fixed thereon.

In this constitution, the protectiveness of the coating is well maintained such that optical fibers are not damaged upon separation of single fiber, and the films can be easily peeled off from the bonded ends with the winding-starting end 4s and the winding-finishing end 4e.

Embodiment 3

Figure 7:
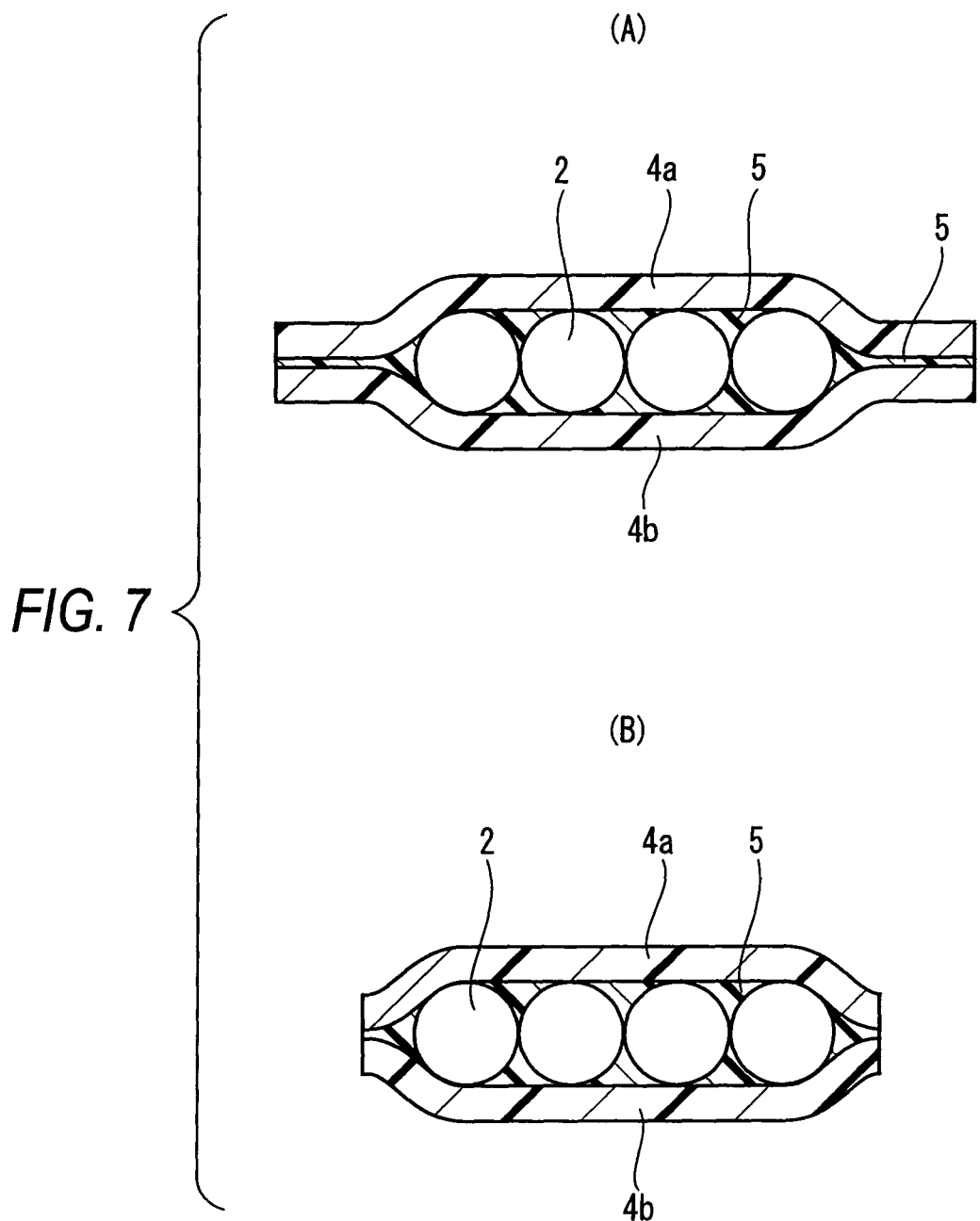
FIG. 7 is a schematic diagram showing the cross-section of the optical fiber ribbon of Embodiment 3 of the invention.

In Embodiment 1, the coated optical fibers 2 were inserted between two sheets of the film substrates 4a and 4b. However, this embodiment is characterized in that, as shown in FIG. 7(A), two sheets facing each other are protruded from the arranged ends of the coated optical fibers 2 arranged in plane, and are adhered to each other. The materials for the film substrates 4a and 4b, and the adhesive layer 5 are the same with those used in Embodiment 2.

In this constitution, the protectiveness of the coating is well maintained such that when peeling is initiated from the part protruded from the arranged ends of the coated optical fibers upon separation of single fiber, the films can be easily peeled off from the bonded ends without damaging the optical fibers.

Additionally, in a variant of the embodiment, as shown in FIG. 7(B), the portion of the films bonded in parallel at each of the end parts may be removed to shorten the end parts, so that both the good ability for separation of single fiber and the protective function for the coated optical fibers are maintained, while obtaining a high space efficiency.

Further, this constitution allows excellent productivity, since the film substrates can be bonded to the coated optical fibers only by simple pressing.

Embodiment 4

Figure 8:
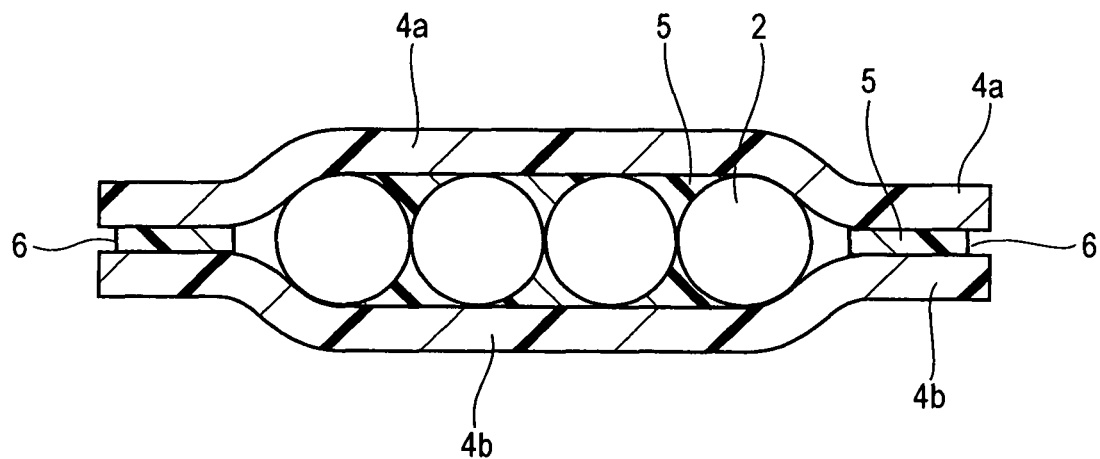
FIG. 8 is a schematic diagram showing the cross-section of the optical fiber ribbon of Embodiment 4 of the invention.

In Embodiment 3, the coated optical fibers 2 arranged in plane were inserted between two sheets of the film substrate 4a and 4b, and the two film sheets facing each other that are protruded from the arranged ends of the coated optical fibers 2 were adhered to each other. However, this embodiment is characterized in that, as shown in FIG. 8, the two sheets facing each other that are protruded from the layer of the coated optical fibers 2 arranged in plane, are adhered to each other, and further the application areas of the adhesive are maintained interior to the film substrate, rather than at the outer ends, so that the end sections of the film substrates 4a and 4b include non-adhered areas 6 and 6. The materials for the film substrate 4a and 4b, and the adhesive layer 5 are same with the ones used in Embodiments 1 to 3 above.

In this constitution, the protectiveness of the coating is well maintained such that peeling can be performed easily from the non-adhered areas upon separation of single fiber. As such, the films can be easily peeled off from the bonded ends without damaging the optical fibers.

In this constitution, since the end sections of the film substrates 4a and 4b are to include the non-adhered areas 6 and 6, peeling can be performed easily from these non-adhered areas. As the film substrates are adhered on the two opposite sides of a plurality of the coated optical fibers arranged in plane and the end sections of the film substrates are exposed, such constitution is advantageous in that peeling can be performed easily from these end sections.

Further, this constitution allows excellent productivity, since the film substrates can be bonded to the coated optical fibers only by simple pressing.

Embodiment 5

Figure 9:
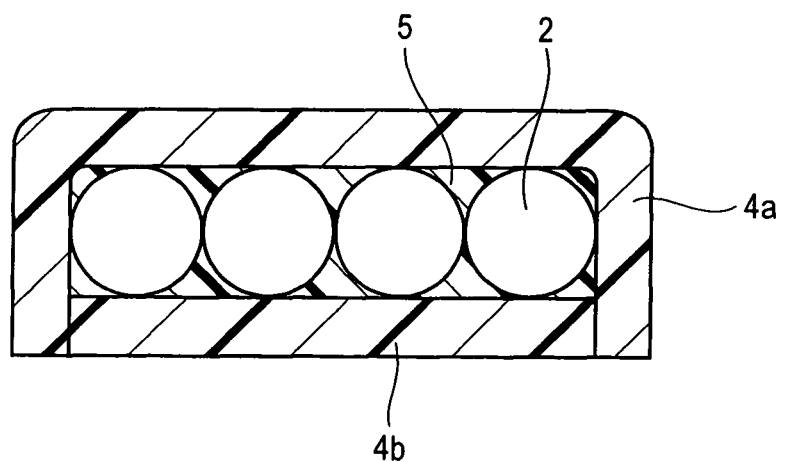
FIG. 9 is a schematic diagram showing the cross-section of the optical fiber ribbon of Embodiment 5 of the invention.

In Embodiment 3, the coated optical fibers 2 arranged in plane were inserted between two sheets of the film substrates 4a and 4b, and the two film sheets facing each other that are protruded from the arranged ends of the coated optical fibers 2 were adhered to each other. However, this embodiment consists in that, as shown in FIG. 9, the upper film substrate 4a is formed into the shape of ⊃ covering the upper and side parts of the coated optical fibers 2 arranged in plane, so that it is contacted with the two ends of the lower film substrate 4b disposed underneath the coated optical fibers 2. The materials for the film substrates 4a and 4b, and the adhesive layer 5 are also same with those used in Embodiments 1 to 3 above.

In this constitution, the protectiveness of the coating is well maintained such that peeling can be performed easily from the bonded ends of the film substrates upon separation of single fiber. As such, the films can be easily peeled off from the bonded ends without damaging the optical fibers.

Embodiment 6

Figure 10:
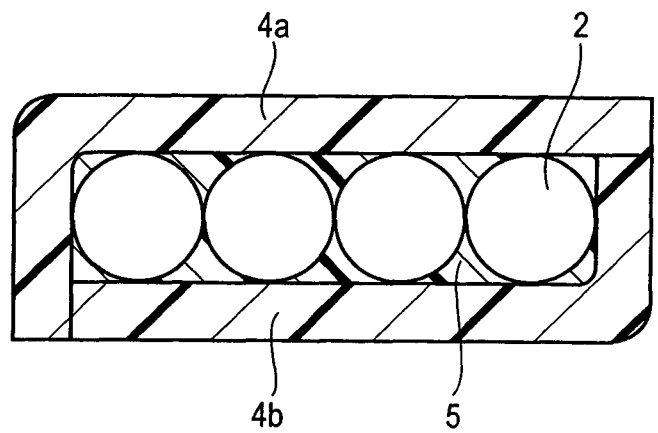
FIG. 10 is a schematic diagram showing the cross-section of the optical fiber ribbon of Embodiment 6 of the invention.

In Embodiment 3, the coated optical fibers 2 arranged in plane were inserted between two sheets of the film substrates 4a and 4b, and the two film sheets facing each other that are protruded from the arranged ends of the coated optical fibers 2 were adhered to each other. However, this embodiment is characterized in that, as shown in FIG. 10, the two L-shaped sheets of the film substrates 4a and 4b surround the periphery of the coated optical fibers 2 arranged in plane, and the two sheets of the film substrates 4a and 4b are contacted at two regions on the diagonal.

The materials for the film substrates 4a and 4b, and the adhesive layer 5 are also same with those used in Embodiments 1 to 3 above.

In this constitution, the protectiveness of the coating is well maintained such that peeling can be performed easily from the bonded ends of the film substrates upon separation of single fiber. As such, the films can be easily peeled off from the bonded ends without damaging the optical fibers.

Embodiment 7

Figure 11:
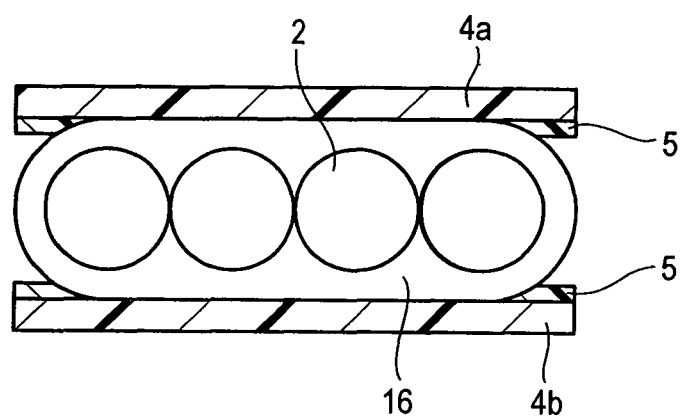
FIG. 11 is a schematic diagram showing the cross-section of the optical fiber ribbon of Embodiment 7 of the invention.

In Embodiment 6, the film substrates 4a and 4b having the adhesive layer 5 formed thereon directly surround the coated optical fibers 2 arranged in plane. However, this embodiment is characterized in that, as shown in FIG. 11, the coated optical fibers 2 arranged in plane are coated with a UV-curable resin 16 or the like in the same way as the prior art, and the external side of the assembly is coated with the film substrates 4a and 4b having the adhesive layer 5 formed thereon, in the same way as Embodiment 3.

The materials for the film substrates 4a and 4b, and the adhesive layer 5 are also same with those used in Embodiments 1 to 3 above.

That is, in this embodiment, the peripheries of a plurality of the coated optical fibers 2 arranged in plane are coated with a UV-curable resin 16, and the external side of the assembly is coated with the flame-retardant film substrates 4a and 4b having the adhesive layer 5 formed thereon.

Thus, a tough and highly reliable optical fiber ribbon can be formed.

Embodiment 8

Figure 12:
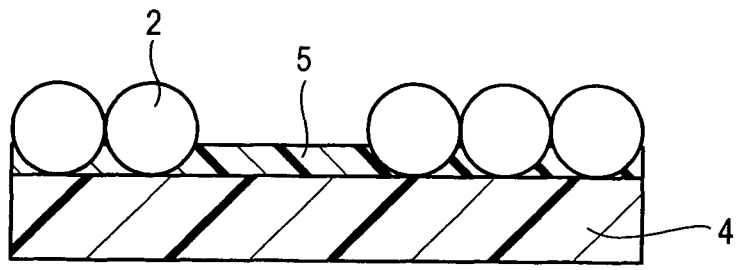
FIG. 12 is a schematic diagram showing the cross-section of the optical fiber ribbon of Embodiment 8 of the invention.

In Embodiments 2 to 7, a flame-retardant film was used in coating the coated optical fibers 2 arranged in plane to envelop them. However, this embodiment is characterized in that, as shown in FIG. 12, only one side of the coated optical fibers 2 arranged in plane is fixed by a film substrate 4 with an adhesive layer 5 formed thereon. The materials for the film substrates 4a and 4b and the adhesive layer 5 are also same with those used in Embodiments 1 to 3 above.

In this constitution, since upon separation of single fiber, one side of the coated optical fibers is exposed, the films can be simply peeled off from the bonded ends of the film substrates. Further, the protectiveness of the coating is well maintained since the adhesive layer is inserted between the coated optical fibers 2, and between the film substrate and the coated optical fibers.

As such, the film can be easily peeled off from the bonded ends without damaging the optical fibers.

In addition, even though one side is exposed in this embodiment, the constitution of optical fiber codes or cables in which the film substrate is on one side gives the minimum flame-retardancy.

Further, this structure results in excellent productivity because the film substrate can be bonded to the coated optical fibers only by simple pressing step.

Embodiment 9

Figure 13:
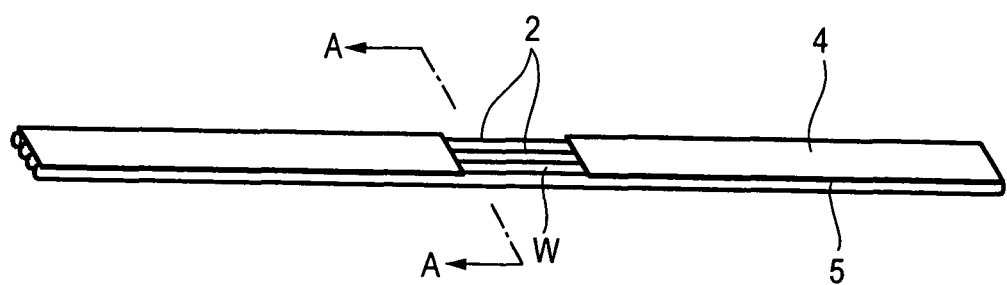
FIG. 13 is a schematic diagram showing the side-view of the optical fiber ribbon of Embodiment 9 of the invention.

In this embodiment, as shown in FIG. 13, a one-sided adhesive film having intermittent openings W formed thereon is used to fix one side of the coated optical fibers 2 arranged horizontally in order to facilitate separation of single fiber from the openings. The coated optical fibers 2 used in this embodiment were the same as in the constitution shown in FIG. 2.

This one-sided adhesive film is characterized in that a film substrate 4 having openings W formed thereon at predetermined intervals, is fixed with an adhesive layer 5. This adhesive layer 5 preferably has a thickness of 30 μm or less in order to prevent adhesion of the end sections effectively.

In this constitution, since one side of the coated optical fibers is exposed and openings W are formed, separation of single fiber can be carried out by simply peeling off from these openings W. Further, although the film is a one-sided adhesive film, as shown in the cross-sectional view in FIG. 14(A), the protectiveness of the coating is well maintained since the adhesive layer 5 is inserted between the coated optical fibers 2, and between the film substrate 4 and the coated optical fibers 2. Additionally, since the film is adhered to one side of a plurality of the arranged coated optical fibers, it is possible to obtain a thinner optical fiber ribbon compared with a conventional optical fiber ribbon.

Figure 14:
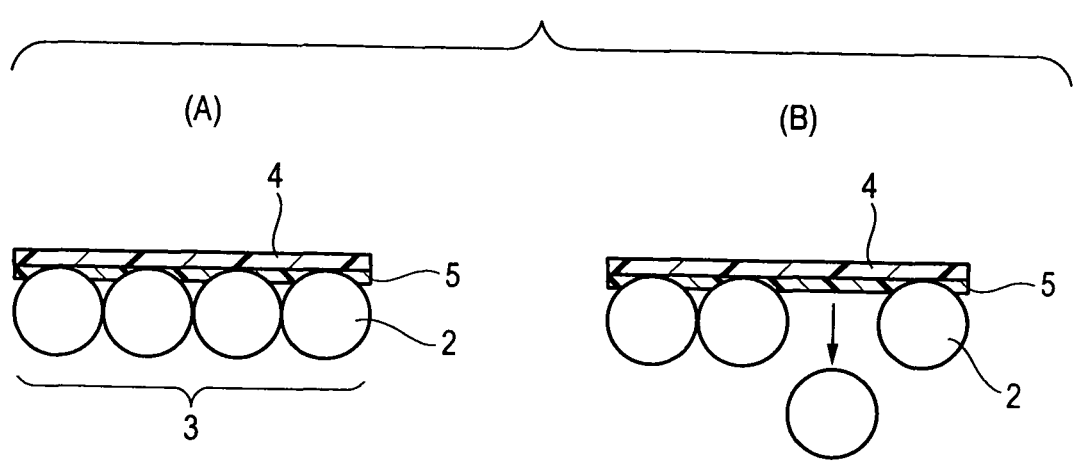
FIG. 14 is a schematic diagram showing the cross-section of the optical fiber ribbon of Embodiment 9 of the invention.
Figure 15:
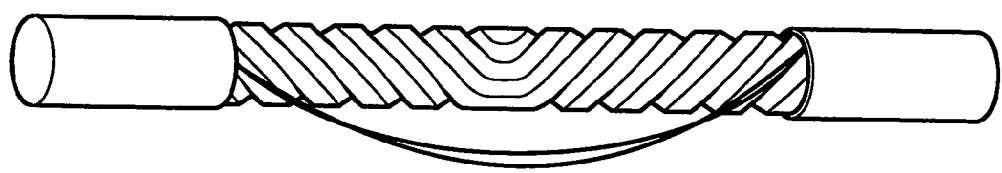
FIG. 15 is a schematic diagram showing the side-view of the slot in which the optical fiber ribbon of Embodiment 9 of the invention can be placed.
Figure 16:
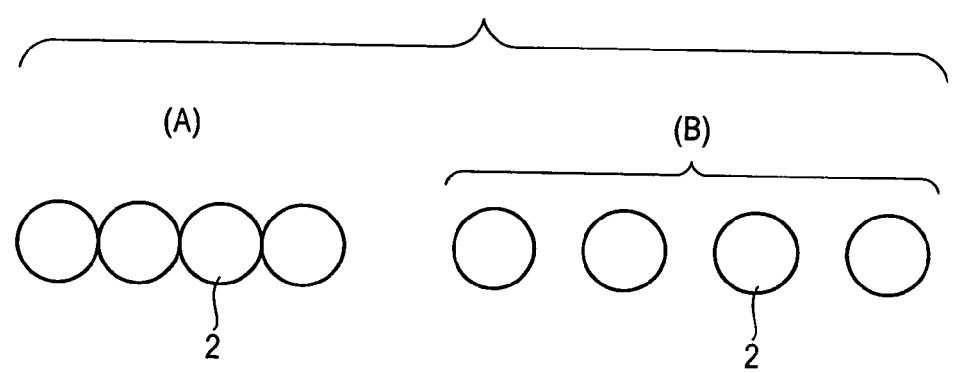
FIG. 16 is a flow diagram showing the separation step of single fiber for the optical fiber ribbon of Embodiment 9 of the invention.

An optical fiber ribbon 1 is formed by arranging four coated optical fibers 2 in parallel in a latitudinal row and pressing one side of the assembly with film 4 via an adhesive layer 5. Upon separation of single fiber, as shown in FIG. 14(B), the coated optical fibers 2 can be separated from the openings W without damaging the optical fibers. The interval of the openings is preferably formed such that at least one opening W is placed in one stroke of the SZ slot, as shown in FIG. 15. FIG. 16(A) shows an A-A cross-sectional view of FIG. 13. Typically, the coated optical fibers 2 are arranged to contact with one another. However, upon separation of single fiber, the coated optical fibers 2 are easily distanced from one another as shown in FIG. 16(B), by means of simple operations such as twisting or unfolding at the openings W.

Further, in order to enable distinction between the coated optical fibers, use can be made of a one-sided adhesive film that is colored with any desired color. In this constitution, it becomes easy to distinguish the color assigned to the coating of the coated optical fibers at the portions where the film does not cover, and thus the degree of freedom becomes increased.

Additionally, the film substrate can have marking regions formed thereon in order to enable distinction between the coated optical fibers. In this case, too, it becomes easy to distinguish the color assigned to the coating of the coated optical fibers at the portions where the film does not cover, and thus the degree of freedom becomes increased.

When the film substrate surface is subjected to slide treatment by using, for example, a surface-roughened (matt-treated) material by means of sandblasting (physical), chemical etching (chemical) or the like, silicone-PET in which a silicone resin layer is formed on one side of PET, or antistatically-treated PET, mounting onto the slots is facilitated. When a film whose surface has been subjected to slide treatment is used as the film substrate, the sliding property within the slot is improved, and thus the formation process can be carried out without using any special lubricant. Further, when the openings formed on the optical fiber ribbons are formed with a pitch smaller than the twisting pitch of the SZ cable, the degree of freedom becomes very high even on branch wiring, and workability is good.

The method of manufacturing the optical fiber ribbons of this embodiment will be described. First, a plurality of coated optical fibers 2 are arranged horizontally. Then, on the surface of a film substrate 4 made of a polyester resin, an adhesive layer 5 made of a silicone resin and having a thickness of about 30 μm is applied to. This is disposed on a plurality of the coated optical fibers 2 arranged as in the above, and the assembly is pressed.

Figure 17:
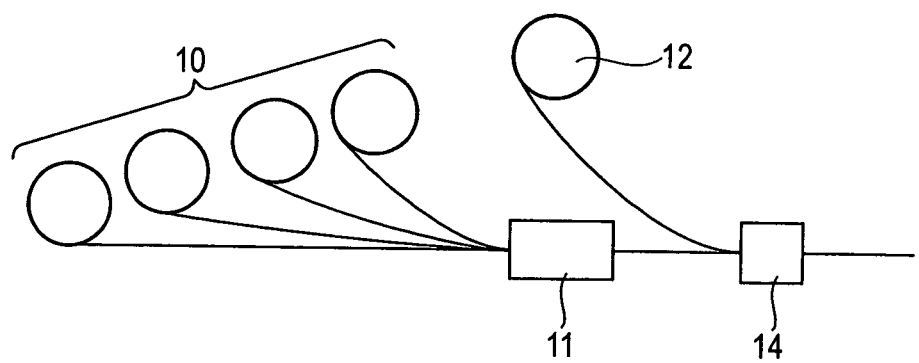
FIG. 17 is a schematic diagram showing the production apparatus for the optical fiber ribbon of Embodiment 9 of the invention.

FIG. 17 is a flow diagram outlining the method of manufacturing the same. A plurality of coated optical fibers 2 are wound back from reels 10 while being sequentially arranged, and are lined up horizontally at the line-up section 11 such as a guide roll. A film substrate 4 having an adhesive layer 5 attached thereon is supplied from a film reel 12, and the arranged coated optical fibers are fixed to the film at the pressing section 14. Here, although FIG. 17 shows only four reels, a large number of reels are used. After bonding, the assembly is cut to include a desired number of optical fiber ribbons, so that optical fiber ribbons having a desired number (for example, four) of the coated optical fibers 2 can be obtained.

Thus, the adhesive layer can be advantageously inserted between the coated optical fibers or between the film substrate and the coated optical fibers to enhance the adhesiveness. By forming a plurality of the coated optical fibers together at once and cutting the assembly to a bundle of a desired number of optical fiber ribbons along the direction of the length, the optical fiber ribbons can be formed with good workability.

With this type of the optical fiber ribbon, the coated optical fibers can be easily extracted from the openings W upon separation of single fiber, and thus branching operation can be carried out very easily. The thickness is lowered and good appearance is also obtained.

Furthermore, the adhesive layer may contain, in addition to a silicone-based adhesive, an additive such as a plasticizer and a stabilizer. In addition to silicone resins, it is also possible to use acrylic-based adhesives, rubber-based adhesives or the like.

Further, while an adhesive resin was used for the adhesive layer in this embodiment, it is possible to use a thermoplastic resin such as a polyolefin-based resin, a thermosetting resin such as an epoxy resin, a UV-curable resin or the like, instead.

The film substrate can be nylon, polyimide or the like, in addition to PET. Further, when adhesion is associated with a heating step, it is preferable to use a resin that does not melt at the adhesion temperature.

Embodiment 10

Figure 18:
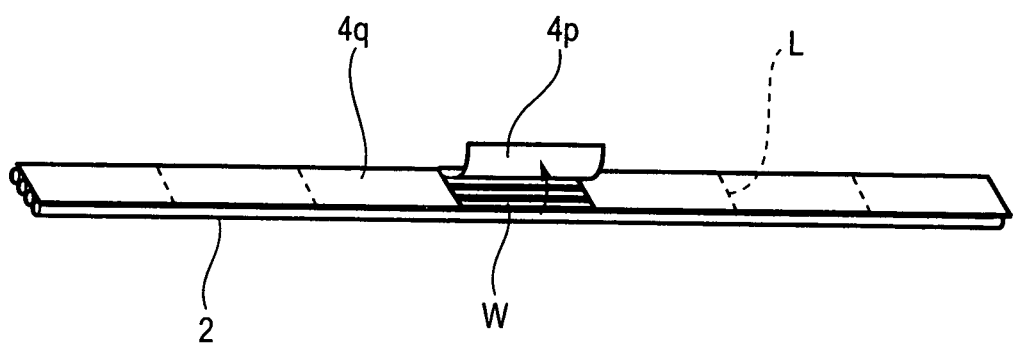
FIG. 18 is a schematic diagram showing the side-view of the optical fiber ribbon of Embodiment 10 of the invention.

This embodiment is characterized in that, as shown in FIG. 18, peeling regions 4p, where films are peeled off at predetermined intervals, are formed to facilitate formation of openings W. Here, a uniaxially drawn film is disposed with the drawing direction of the film being perpendicular to the fibers, and is adhered to the fibers, and the film can be torn off at any portions. Preferably, break lines L are formed on the film for easy peeling-off, and openings W are formed. In this constitution, formation of the openings W becomes easy, thereby facilitating separation of single fiber. Further, it is also possible to make perforations continuously along the peeling regions 4p so that the film can be peeled off along the perforations.

A film substrate can be appropriately varied depending on the use and the required performance, and can be selected from nylon or the like, in addition to PET. Further, the adhesive can be appropriately selected from silicone-based resins, acrylic-based resins, rubber-based resins or the like. It is preferable to have said facilitation regions formed at a small pitch such that the pitch is even smaller than, for example, the twisting pitch of an SZ cable. In the even the case where it is necessary to branch SZ cables after installing them, such constitution allows to carry out separation of single fiber freely. The thickness of the adhesive layer is preferably 30 μm or less. This can satisfy both the fixing property and the easy peeling property. Additionally, although illustration was made only on the example of forming a film substrate on only one side, it is also possible to dispose the film substrates alternately on both sides at a predetermined interval.

Further, by using a thermosetting resin, a thermoplastic resin or an adhesive resin, each of which a flame-retardant is added to, as the adhesive layer, flame-retardancy can be imparted to the optical fiber ribbons.

Embodiment 11

Figure 19:
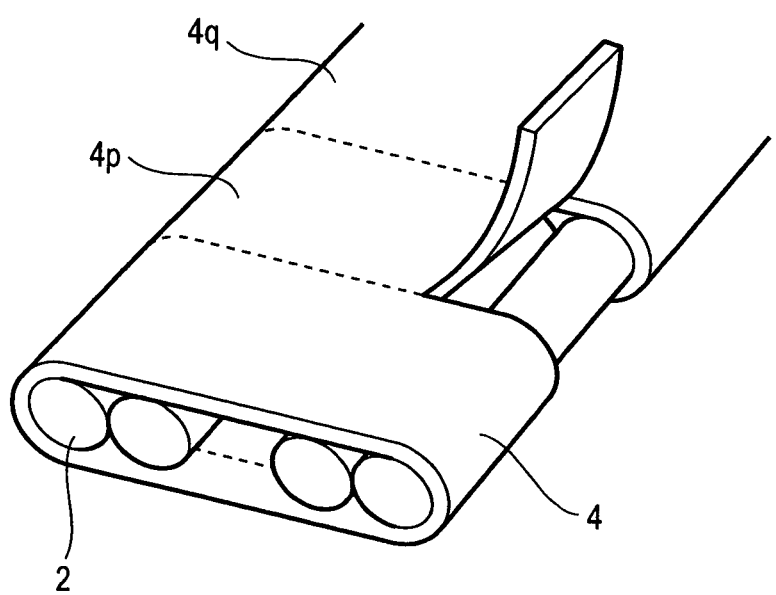
FIG. 19 is a schematic diagram showing the side-view of the optical fiber ribbon of Embodiment 11 of the invention.

This embodiment is characterized in that, as shown in FIG. 19, facilitation regions 4p where film peeling is facilitated are formed at predetermined intervals. Here, it is constituted such that the facilitation regions 4p can be separated at the boundaries with the normal region 4q by forming cutting grooves by means of mechanical processing.

In this case, too, a flame-retardant film is used to directly coat the coated optical fibers 2 arranged in plane to envelop them.

Here, the materials for the film substrate itself and the adhesive layer are same with those used in the previous embodiments. In this constitution, separation of single fiber can be carried out easily at the facilitation regions. Further, these facilitation regions 4p may be formed by attaching other material that allows separation at the boundaries with the normal region 4q, or by disposing a uniaxially drawn film, with the drawn direction being perpendicular to the fibers, adhering them, and constituting the assembly such that the film can be torn off at any portions.

The film substrate can be varied if appropriate, depending on the use and required performance, and can be selected from polyvinyl chloride (PVC), polyimide or the like, in addition to polyester. A thermoplastic adhesive can be appropriately selected from PVC-based, polyolefin-based adhesives and the like, in addition to polyesters. It is preferable to have the facilitation regions formed at a small pitch such that the pitch is even smaller than, for example, the twisting pitch of an SZ cable. When it is necessary to branch SZ cables after installing them, such constitution allows carrying out separation of single fiber freely.

Embodiment 12

Figure 20:
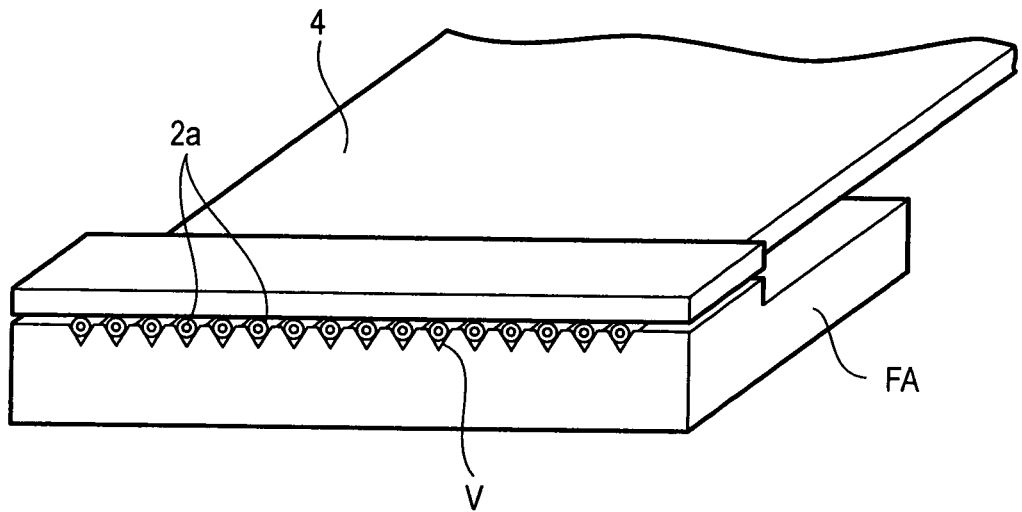
FIG. 20 is a schematic diagram showing the side-view of the optical fiber array according to the invention.

As shown in FIG. 20, a fiber array having the optical fiber ribbon, in which at one end of the optical fiber ribbon described in one of Embodiments 1 to 11, the film 4 is all peeled off, exposing the glass fibers 2a, and disposed on grooves V of a fiber array FA, is also effective.

Embodiment 13

Figure 21:
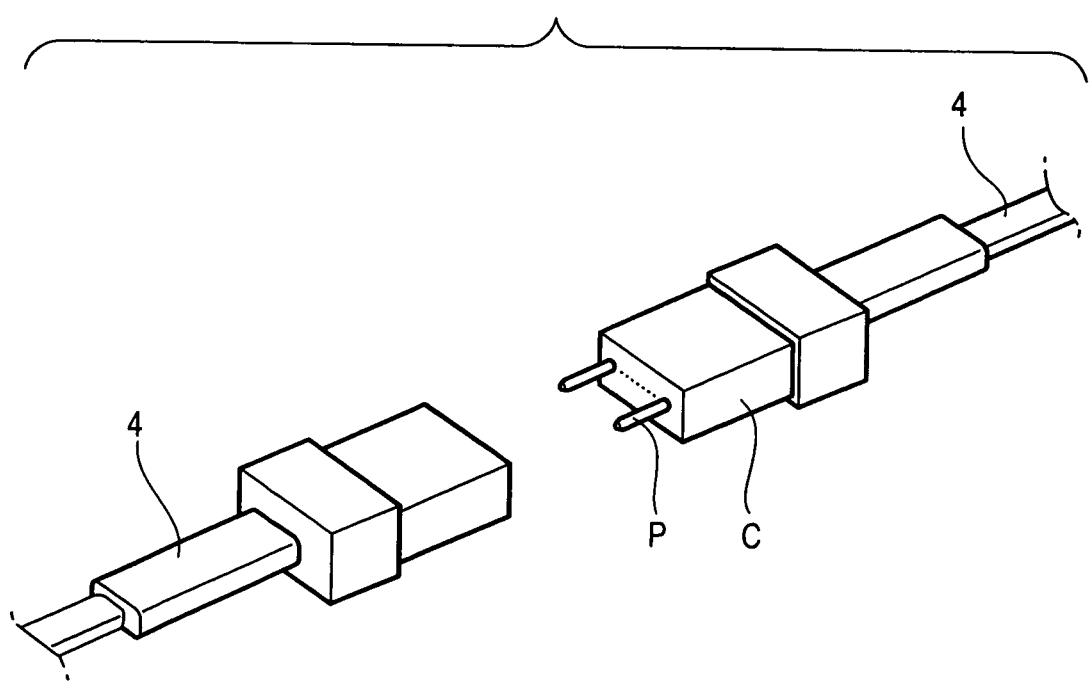
FIG. 21 is a schematic diagram showing the side-view of the connector having the optical fiber ribbon according to the invention.
Figure 22:
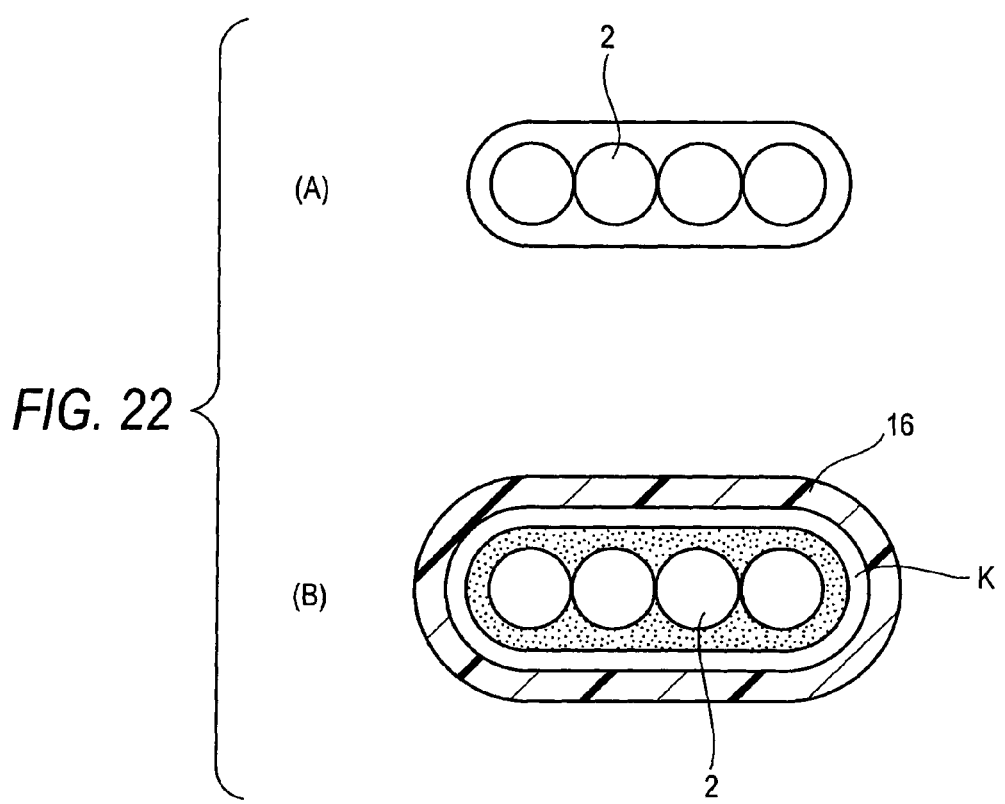
FIG. 22 is a schematic diagram showing the cross-section of a conventional optical fiber ribbon.

As shown in FIG. 21, a connector having the optical fiber ribbon, in which the optical fiber ribbon described in any one of Embodiments 1 to 11 is connected to a multi-fiber connector C, is also effective since branch connection is easy even on the way. Herein, P is a pin for deciding the position.

Together with imparting flame-retardancy to the film 4 of this optical fiber ribbon, a connector having the optical fiber ribbon, in which an entire-resin multi-fiber optical ferrule formed from a flame-retardant resin, is also effective. By imparting flame-retardancy to the film which directly contacts the coated optical fibers, and the ferrule together, occurrence of unpredicted situations can be avoided.

Further, an optical wiring system, in which the optical fiber ribbon as described above, or the optical fiber ribbon produced by the above-described method is wired, is also effective.

INDUSTRIAL APPLICABILITY

As explained hereinabove, according to the optical fiber ribbon of the present invention, it is possible to provide a thin type, flame-retardant optical fiber ribbon with good coating property.

Further, it is possible to provide an optical fiber ribbon which allows easy separation of single fiber.

Furthermore, according to the method of manufacturing the optical fiber ribbon of the present invention, it is possible to provide a flame-retardant optical fiber ribbon easily with good workability.

The invention claimed is:

1. An optical fiber ribbon comprising:
    a plurality of coated optical fibers arranged in plane, each of the coated optical fibers having a glass fiber and a UV-curable resin coating the glass fiber; and
    a flame-retardant film integrating the coated optical fibers, wherein the flame-retardant film comprises an adhesive layer having flame-retardancy, said flame-retardancy being provided by a bromine-based flame retardant added to the adhesive layer, the film is press-bonded so that the adhesive layer is inserted between the UV-curable resins of adjacent coated optical fibers, and said adhesive layer is in direct contact with said UV-curable resin.

2. The optical fiber ribbon according to claim 1, wherein Young's Modulus of the adhesive layer is 10 to 500 MPa.

3. The optical fiber ribbon according to claim 1, wherein shrinkage of the film in a heat treatment at 150° C. for 30 minutes is 3% or less.

4. The optical fiber ribbon according to claim 1, wherein each of the coated optical fibers comprises a colored layer.

5. The optical fiber ribbon according to claim 4, wherein the flame-retardant film further comprises a film substrate and at least a portion of the film substrate is light-transmissive.

6. The optical fiber ribbon according to claim 1, wherein the adhesive layer includes a thermoplastic resin.

7. The optical fiber ribbon according to claim 1, wherein the flame-retardant film is adhered to one side of the plurality of the coated optical fibers arranged in plane.

8. The optical fiber ribbon according to claim 7, wherein the flame-retardant film is formed intermittently in the longitudinal direction such that regions partially exposing the plurality of the coated optical fibers are formed.

9. The optical fiber ribbon according to claim 5, wherein the film substrate is made of a polyester resin.

10. The optical fiber ribbon according to claim 1, wherein the optical fiber ribbon has flame-retardant property as defined in UL 1581 VW-1.

11. The optical fiber ribbon according to claim 1, wherein the optical fiber ribbon has a thickness of 480 μm or less.

12. The optical fiber ribbon according to claim 5, wherein the flame-retardant film comprises two film substrates adhered at two opposite sides of the coated optical fibers arranged in plane, and are protruded from arranged ends of the coated optical fibers, such that end sections of the film substrates are exposed.

13. The optical fiber ribbon according to claim 6, wherein the flame-retardant film has a film substrate and the adhesive layer, the adhesive layer being a polyolefin-based resin with the bromine-based flame-retardant added.

14. The optical fiber ribbon according to claim 1, wherein a UV-curable resin is inserted between the plurality of the coated optical fibers arranged in plane and the flame-retardant film, to integrate the plurality of the coated optical fibers for coating them.

15. A method of manufacturing an optical fiber ribbon, comprising:
   an arranging step of arranging a plurality of coated optical fibers in plane, wherein the optical fibers are coated with a UV-curable resin; and
   a press-bonding step of bonding the plurality of the arranged coated optical fibers with a flame-retardant film so that the adhesive layer is inserted between and in direct contact with the UV-curable resins of adjacent coated optical fibers, wherein the flame-retardant film comprises an adhesive layer having flame-retardancy, said flame-retardancy being provided by a bromine-based flame retardant added to the adhesive layer.

16. The method of manufacturing an optical fiber ribbon according to claim 15, wherein the flame-retardant film has a film substrate and a thermoplastic resin layer formed on a surface of the film substrate, and wherein the bonding step includes the bonding step of superimposing the arranged coated optical fibers with the flame-retardant film and heat pressing its assembly.

17. The method of manufacturing an optical fiber ribbon according to claim 15, further comprising:
   a step of integrating a plurality of the coated optical fibers with a UV-curable resin to coat them, prior to the bonding step.

18. A connector with an optical fiber ribbon, in which the optical fiber ribbon according to claim 1, is connected to a multi-fiber connector.

19. The connector with an optical fiber ribbon according to claim 18, wherein the optical fiber ribbon is connected to an entire-resin multi-fiber optical ferrule formed from a flame-retardant resin.

20. The connector with an optical fiber ribbon according to claim 19, wherein the entire-resin multi-fiber optical ferrule includes a polyphenylene sulfide resin.

21. A fiber array with an optical fiber ribbon, in which the optical fiber ribbon according to claim 1, is connected to a fiber array.

22. An optical wiring system, in which the optical fiber ribbon according to claim 1, is wired.

23. A connector with an optical fiber ribbon, in which the optical fiber ribbon produced by the manufacturing method according to claim 15, is connected to a multi-fiber connector.

24. The connector with an optical fiber ribbon according to claim 23, wherein the optical fiber ribbon is connected to an entire-resin multi-fiber optical ferrule formed from a flame-retardant resin.

25. The connector with an optical fiber ribbon according to claim 24, wherein the entire-resin multi-fiber optical ferrule includes a polyphenylene sulfide resin.

26. A fiber array with an optical fiber ribbon, in which the optical fiber ribbon produced by the manufacturing method according to claim 15, is connected to a fiber array.

27. An optical wiring system, in which the optical fiber ribbon produced by the manufacturing method according to claim 15, is wired.

* * * * *